Figure 1:
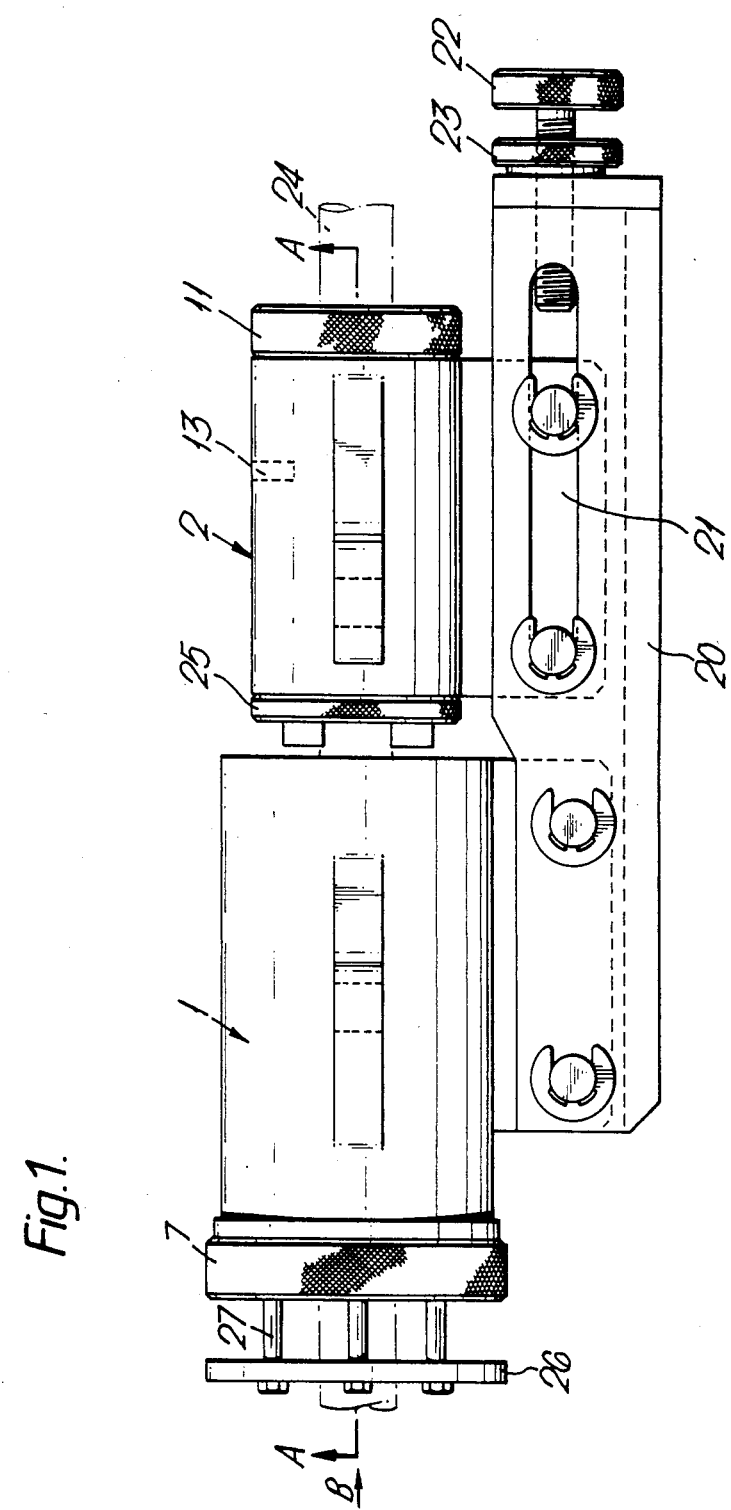

United States Patent [19]

Higgins

[11] Patent Number: 4,569,129

[45] Date of Patent: Feb. 11, 1986

[54] TUBE CUTTING DEVICE

[75] Inventor: Ivan P. Higgins, London, England

[73] Assignee: BICC plc, London, England

[21] Appl. No.: 514,704

[22] Filed: Jul. 18, 1983

[30] Foreign Application Priority Data

Jul. 28, 1982 [GB] United Kingdom ............... 8221851

[51] Int. Cl.[4] ...................... B21F 13/00; B23D 21/06
[52] U.S. Cl. ........................................ 30/90.4; 30/92; 30/92.5
[58] Field of Search ............... 30/90.4, 92.5, 92, 90.8, 30/90.9

[56] References Cited

U.S. PATENT DOCUMENTS

| | | | |
|---|---|---|---|
| 1,629,696 | 5/1977 | Goff | 30/92.5 |
| 3,315,355 | 4/1967 | Osburn et al. | 30/92 X |
| 3,613,236 | 10/1971 | Lauck | 30/92.5 |
| 3,988,826 | 11/1976 | Heikkala | 30/90.4 |

FOREIGN PATENT DOCUMENTS 3028370  2/1982  Fed. Rep. of Germany .......... 30/92

Primary Examiner—E. R. Kazenske
Assistant Examiner—Willmon Fridie, Jr.
Attorney, Agent, or Firm—Parkhurst & Oliff

[57] ABSTRACT

A device for cutting at least one longitudinally extending slit in the wall of a tub, which device comprises a substantially tubular thruster unit and a substantially tubular cutter unit arranged in axial alignment, which thruster unit includes a first gripping means for preventing the tube, which has been introduced through the bore of the thruster unit into the bore of the cutter unit, from moving relative to the thruster unit in a direction away from the cutter unit and which cutter unit includes at least one tooth for cutting a longitudinally extending slit in the wall of said tube and, between said tooth and the thruster unit, a second mechanism for preventing the tube from moving relative to the cutter unit in a direction towards the thruster unit; a double handled mechanism for urging the cutter unit in an axial direction relative to and a limited distance towards and away from the thruster unit; and, associated with each unit, adjustable mechanism for releasing the associated gripping mechanism.

9 Claims, 2 Drawing Figures

TUBE CUTTING DEVICE

This invention relates to a device for cutting at least one longitudinally extending slit in the wall of a tube. The device has special, though not exclusive, use for so cutting the tubular metallic sheath of a mineral insulated cable, or the tubular central core of an overhead electrical conductor of the kind which has at least one optical fibre loosely housed in the tube and which is described and claimed in the Complete Specification of our UK Pat. No. 1598438, to facilitate stripping of the cable or conductor.

According to the invention, we provide an improved device for cutting at least one longitudinally extending slit in the wall of a tube, which device comprises a substantially tubular thruster unit and a substantially tubular cutter unit arranged in axial alignment, which thruster unit includes first spring loaded gripping means for preventing the tube, which has been introduced through the bore of the thruster unit into the bore of the cutter unit, from moving relative to the thruster unit in a direction away from the cutter unit and which cutter unit includes at least one tooth for cutting a longitudinally extending slit in the wall of said tube and, between said tooth and the thruster unit, second spring loaded gripping means for preventing said tube from moving relative to the cutter unit in a direction towards the thruster unit; means for urging the cutter unit in an axial direction relative to and a limited distance towards and away from the thruster unit; and, associated with each unit, adjustable means for releasing its associated gripping means.

The arrangement is such that, after a tube has been introduced through the bore of the thruster unit into the bore of the cutter unit and is gripped by the gripping means of each unit, the cutter unit is urged axially towards the thruster unit a limited distance relative to the tube to cause the tooth to cut a longitudinally extending slit of a predetermined length in the wall of the tube (the tube being held stationary relative to the thruster unit by the first gripping means); the cutter unit is then moved axially away from the thruster unit a limited distance (the second gripping means on the cutter unit securing the tube and pulling it through the thruster unit) and, if necessary, said relative axial movements of the cutter and thruster units are repeated until a longitudinally extending slit of the required length has been cut in the wall of the tube; and said adjustable means are actuated to release the gripping means and so permit withdrawal of the longitudinally slit tube. The required length of cut can be calculated from the distance travelled by the cutter unit towards the thruster unit and the number of full strokes made, or by placing some form of marking device on the tube.

The advantage of this device is that a cut can be made in the tube to a predetermined depth, and hence when used on mineral insulated cables or overhead conductors, the tubular metallic sheath can be cut and removed without damaging the electrical or optical conductors positioned inside the tube.

Preferably, there are two cutting teeth diametrically opposed within the bore of the cutting unit.

The tooth or teeth are preferably removably mounted within the bore of the cutting unit. In this case, the tooth or teeth is or are preferably mounted within the bore of a tubular holder, which is longitudinally split into two parts, on diametrically opposed sides of the holder, and which is removably mounted in the bore of the cutting unit (the longitudinal axes of the bores being aligned) and secured in place by a locking nut. This arrangement has the advantage that the tooth or teeth can be easily replaced when worn, changed to alter the depth of cut, or changed to use teeth of a material appropriate for the material of the tube to be cut. The tubular holder can also be changed so that the device can be used to cut a tube of any diameter within a limited range of diameters differing from one another.

The wall of the cutting unit preferably has an aperture through it which aligns with a cutting tooth. Material cut from the tube can pass out through the aperture. Where the tooth or teeth is or are mounted in a tubular holder, the holder preferably also has an aperture aligned with the or each tooth. In this case, the cutting unit preferably has a pin projecting into its bore which mates with a longitudinally extending slot in the outer surface of the tubular holder to ensure the apertures in the holder and in the wall of the cutting unit align.

The second gripping means in the cutting unit preferably comprises two diametrically opposed, pivotally mounted, spring-loaded cams having ribbed or otherwise serrated outer faces which project into the bore of the cutting unit. The cams are arranged such that they will pivot away from the bore against the action of the springs when a tube is pushed through the bore towards the cutting tooth or teeth; the ribs on the outer faces of the cams will bite into the tube to prevent movement of a tube in the opposite direction, the gripping means thereby acting as a type of rachet. Preferably a locking ring has a surface which abuts surfaces on the cams, the surfaces being so shaped that, and on rotation of the locking ring the cams pivot out of the bore of the cutting unit, the locking ring thereby acting as the release means for the cams to allow the tube to be pulled back through the cutting unit when required. The spring loading of each cam preferably comprises a coil spring, although a leaf spring may be used. This cam gripping arrangement will accept any tube of a diameter lying within a limited range of diameters differing from one another.

The first gripping means in the thruster unit preferably comprises a sleeve which is in screw threaded engagement in the bore of the thruster unit and which has a tapered bore and a spring-loaded collet which slides in and has a tapered outer surface corresponding to the tapered bore of the sleeve, the collet being longitudinally split along diametrically opposed sides and defining a throughbore having a gripping surface, the spring acting to push the collet towards the narrow end of the tapered bore in the sleeve. In use, the tube passes through the tapered bore in the sleeve and through the throughbore defined by the collet before entering the cutting unit. The spring acts on the collet such that its gripping surface engages the tube. Any tendency for the tube to move back through the thruster unit and away from the cutter unit results in movement of the collet towards the narrow end of the tapered bore and hence a tighter grip on the tube to prevent such movement. In this arrangement the collet acts like a wedge.

The release means for the collet gripping means is preferably at least two longitudinally adjustable rods which pass through longitudinally extending holes in the wall of the sleeve to engage the collet and which, on actuation, push the collet against the action of the spring in a direction away from the narrow end of the tapered bore and hence disengages the gripping surface from the tube. The rods are preferably attached to a ring through which the tube also passes, the ring being at the end of the thruster unit remote from the cutter unit. Pushing the ring towards the thruster unit will disengage the collet gripping surface. Where a marking device is placed on the tube, the ring may be engaged by the marking device to prevent overcutting of the tube.

Preferably, the collet is removable from the thruster unit. The collet can therefore be changed so the device can be used on any tube of a diameter within the aforesaid limited range.

The spring acting on the collet is preferably a coil spring.

The means for urging the cutting unit in an axial direction relative to and a limited distance towards and away from the thruster unit preferably comprises two handles pivotally mounted on the thruster unit and cutter unit in such a way that movement of the handles relative to one another effects relative movement between the thruster unit and the cutter unit. Alternatively, the device may be machine operated.

Initially the thruster unit and the cutter unit are axially spaced by predetermined distance which is preferably variable. This allows a length of cut to be made in each stroke which is predetermined, and dependent on the material of the tube and the depth of cut required. In this case, the thruster unit may be fixedly mounted on a plate, and the cutter unit slidably mounted in a slot in the plate, the maximum separation of the units at any one time being adjustable by a lockable bolt which is threaded to the plate, projects into the slot opening to engage the cutter unit, and is mounted such that screwing of the bolt varies the maximum separation.

The device of this invention can be used to cut tube of any material. It can also be adapted to cut tube of any cross-section, not just circular.

Figure 2:
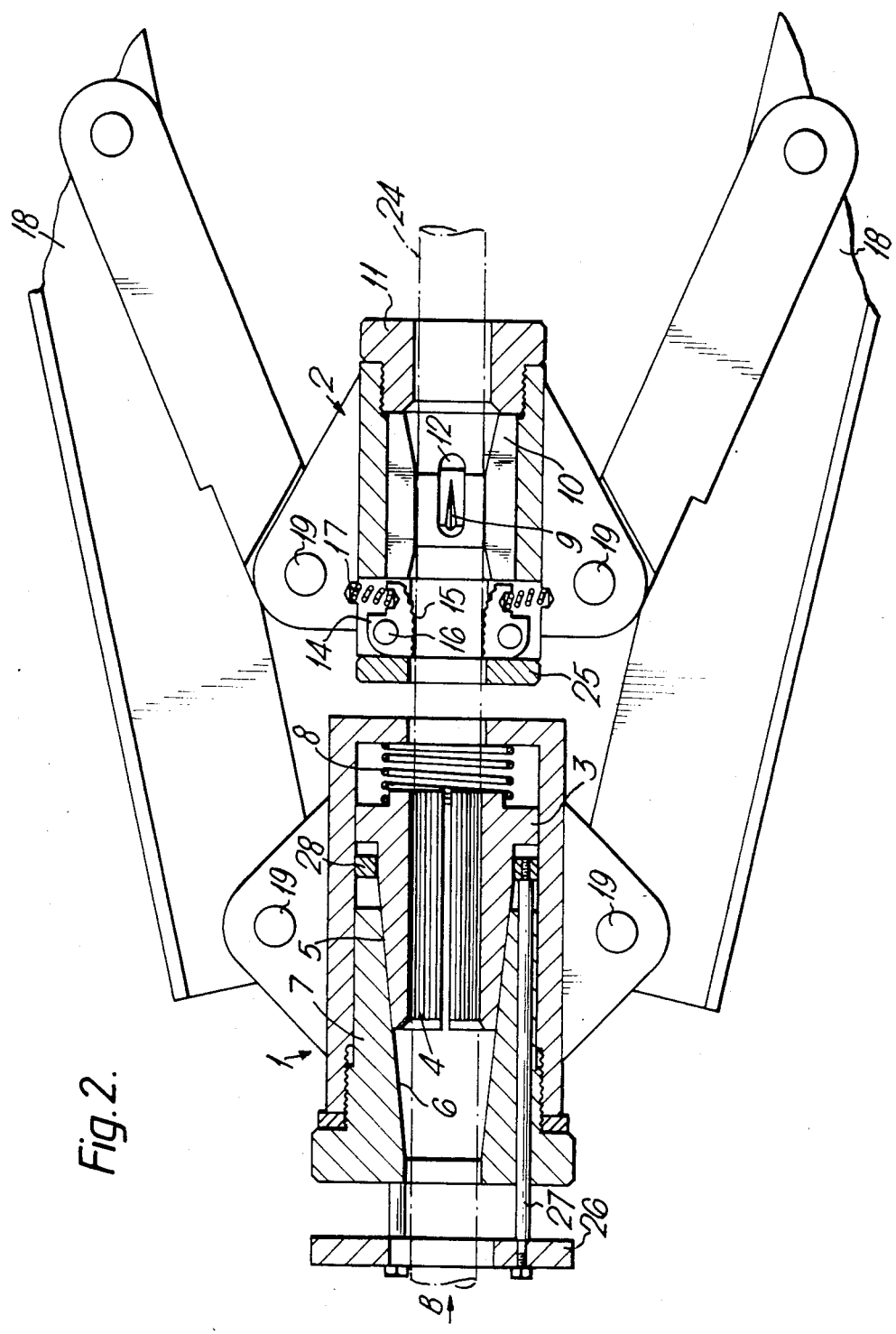

The invention is further illustrated by way of example, by reference to the accompanying drawings, in which:

FIG. 1 is a side view of the preferred device for cutting two longitudinally extending slits in the wall of a tube, the handles being omitted for clarity; and FIG. 2 is a cross-sectional view taken on the line A—A in FIG. 1.

The device shown in FIGS. 1 and 2 comprises a thruster unit 1 and a cutter unit 2 arranged in axial alignment. The thruster unit 1 includes gripping means in the form of a longitudinally split collet 3 having a gripping surface 4 and a tapered outer surface 5, the outer surface corresponding to the tapered inner bore 6 of a collet sleeve 7 which is screw threaded into the thruster unit 1. A coil spring 8 acts on the split collet 3 to push it towards the narrow end of the bore 6 of the sleeve 7. The collet 3 can be removed and replaced by unthreading sleeve 7.

The cutter unit 2 includes two diametrically opposed teeth 9 which are removably mounted in the bore of a tubular holder 10 which is longitudinally split into two parts and which is secured in place by a locking nut 11. When the locking nut 11 is removed the holder 10 can be slid out allowing worn or damaged teeth to be replaced, teeth to be changed to alter the depth of cut, or to be changed to alter the material of the teeth so they are appropriate for the material to be cut.

Apertures 12 in the cutter unit 2 and holder 10 allow cut material to pass out of the cutter unit. A locating pin 13 ensures correct alignment of the apertures in the holder 10 and cutter unit 2.

The cutter unit 2 also includes gripping means in the form of two diametrically opposed cams 14 having serrated faces 15, and which are pivotally mounted on pins 16 and acted on by coil springs 17.

The device also comprises urging means in the form of two handles 18 which are pivotally mounted on pins 19 on the thruster unit 1 and the cutter unit 2 in such a way that movement of the handles relative to one another effects relative movement between the units.

The thruster unit 1 is fixedly secured on a mounting plate 20, and the cutter unit 2 is slidably mounted in a slot 21 in the plate. A screw 22, which can be locked in position by nut 23, and which is threaded to the mounting plate 20 to project into the slot 21, controls (and adjusts if required) the maximum separation of the units 1, 2.

In use, a tube 24 (shown in dotted outline for clarity) is inserted through the thruster unit 1 into the cutter unit 2 up to the teeth 9. The direction of insertion is in the direction B, the split collet 3 and cams 14 being pushed back against their respective coil springs 8, 17 to allow insertion. As the handles 18 are pushed towards one another the cutter unit 2 moves towards the thruster unit 1 and the tube 24 attempts to move in the opposite direction to B. By doing so the split collet 3 moves down the tapered bore 6 to act like a wedge, and together with the gripping surface 4 of the split collet 3 acting on the tube, prevents the tube moving relative to the thruster unit 1. Further movement of the cutter unit 2 towards the thruster unit 1 results in the teeth 9 cutting two diametrically opposed slits in the wall of the tube 24. The handles 18 are then pulled apart and as a result the cutter unit 2 moves away from the thruster unit 1. At this point the serrated faces 15 on the cams 14 grip the tube 24 and pull the tube in the direction B through the thruster unit 1. This cycle is repeated until the required length of cut is achieved.

To remove the tube 24 from the device, a locking ring 25 on the cutter unit 2 is rotated. The ring 25 engages has a surface which abuts surfaces on the cams 14, the surfaces being so shaped that, on rotation of the ring 25, the cams 14 to cause them to pivot against the action of the cam springs 17 and away from the tube 24. A collet release ring 26 has three rods 27 attached to it. The rods 27 extend through the collet sleeve 7 to a second ring 28 adjacent the split collet 3. By pushing on release ring 26 the second ring 28 engages the split collet 3 and moves it back against the action of spring 8 and away from the tube 24. The cut tube 24 can then be removed.

What I claim as my invention is:

1. A device for cutting at least one longitudinally extending slit in the wall of a tube, which device comprises a substantially tubular thruster unit and a substantially tubular cutter unit arranged in axial alignment, which thruster unit includes first spring loaded gripping means for preventing the tube, which has been introduced through the bore of the thruster unit into the bore of the cutter unit, from moving relative to the thruster unit in a direction away from the cutter unit and which cutter unit includes at least one tooth for cutting a longitudinally extending slit in the wall of said tube and, between said tooth and the thruster unit, second spring loaded gripping means for preventing said tube from moving relative to the cutter unit in a direction towards the thruster unit; means for urging the cutter unit in an axial direction relative to and a limited distance towards and away from the thruster unit; and, associated with each unit, adjustable means for releasing its associated gripping means.

2. A device as claimed in claim 1, wherein each said tooth is removably mounted within the bore of the cutting unit.

3. A device as claimed in claim 2, wherein the longitudinal axes of the bores are aligned, and each said tooth is mounted within the bore of a tubular holder, which is longitudinally split into two parts, on diametrically opposed sides of the holder, and which is removably mounted in the bore of the cutting unit and secured in place by a locking nut.

4. A device as claimed in claim 1, wherein the second spring loaded gripping means in the cutting unit preferably comprises two diametrically opposed, pivotally mounted, spring-loaded cams having ribbed or otherwise serrated outer faces which project into the bore of the cutting unit.

5. A device as claimed in claim 1, wherein the adjustable means for releasing the first gripping means comprises at least two longitudinally adjustable rods which pass through longitudinally extending holes in the wall of the sleeve to engage the collet and which, on actuation, push the collet against the action of the spring in a direction away from the narrow end of the tapered bore and hence disengage the gripping surface from the tube.

6. A device as claimed in claim 5, wherein the rods are attached to a ring through which the tube also passes, the ring being at the end of the thruster unit remote from the cutter unit.

7. A device as claimed in claim 1, wherein the means for urging the cutter unit in an axial direction relative to and a limited distance towards and away from the thruster unit comprises two handles pivotally mounted on the thruster unit and cutter unit in such a way that movement of the handles relative to one another effects relative movement between the thruster unit and the cutter unit.

8. A device for cutting at least one longitudinally extending slit in the wall of a tube, which device comprises a substantially tubular thruster unit and a substantially tubular cutter unit arranged in axial alignment, which thruster unit includes first gripping means for preventing the tube, which has been introduced through the bore of the thruster unit into the bore of the cutter unit, from moving relative to the thruster unit in a direction away from the cutter unit and which cutter unit includes at least one tooth for cutting a longitudinally extending slit in the wall of said tube and, between said tooth and the thruster unit, second gripping means for preventing said tube from moving relative to the cutter unit in a direction towards the thruster unit; means for urging the cutter unit in an axial direction relative to and a limited distance towards and away from the thruster unit; and, associated with each unit, adjustable means for releasing its associated gripping means, wherein the second gripping means in the cutting unit comprises two diametrically opposed, pivotally mounted, spring-loaded cams having ribbed or otherwise serrated outer faces which project into the bore of the cutting unit, and wherein a locking ring engages the cams and on rotation causes the cams to pivot out of the bore of the cutting unit, thereby acting as the release means for the cams to allow the tube to be pulled back through the cutting unit when required.

9. A device for cutting at least one longitudinally extending slit in the wall of a tube, which device comprises a substantially tubular thruster unit and a substantially tubular cutter unit arranged in axial alignment, which thruster unit includes first gripping means for preventing the tube, which has been introduced through the bore of the thruster unit into the bore of the cutter unit, from moving relative to the thruster unit in a direction away from the cutter unit and which cutter unit includes at least one tooth for cutting a longitudinally extending slit in the wall of said tube and, between said tooth and the thruster unit, second gripping means for preventing said tube from moving relative to the cutter unit in a direction towards the thruster unit; means for urging the cutter unit in an axial direction relative to and a limited distance towards and away from the thruster unit; and, associated with each unit, adjustable means for releasing its associated gripping means, wherein the first gripping means in the thruster unit comprises a sleeve which is in screw threaded engagement in the bore of the thruster unit and which has a tapered bore and a spring-loaded collet which slides in and has a tapered outer surface corresponding to the tapered bore of the sleeve, the collet being longitudinally split along diametrically opposed sides and defining a throughbore having a gripping surface, the spring acting to push the collet towards the narrow end of the tapered bore in the sleeve.

* * * * *